Patented Apr. 18, 1950

2,504,425

UNITED STATES PATENT OFFICE 2,504,425

SEPARATION OF PURE METHIONINE FROM METHIONINE NITRILE HYDROLYZATES

Robert D. Kralovec, Wilmington, Del., assignor to E. I. du Pont de Nemours & Company, Wilmington, Del., a corporation of Delaware No Drawing. Application May 18, 1948, Serial No. 27,841

11 Claims. (Cl. 260—534)

This invention relates to the synthesis of pure methionine and more particularly to improvements in the separation of methionine from the hydrolysis products of alpha-amino-gamma-methylmercaptobutyronitrile.

In the copending application of W. F. Gresham and C. E. Schweitzer, S. N. 624,328, filed October 24, 1945, now U. S. Patent 2,485,236, which in turn is a continuation of application S. N. 522,966, filed February 18, 1944, now abandoned, an improved synthesis of methionine is disclosed in which acrolein is reacted with methyl mercaptan in the presence of charcoal or an amine catalyst and the resulting product is treated with HCN to form beta-methylmercaptopropionaldehyde cyanhydrin. The latter compound is then subjected to amination by means of high pressure ammonia and the resulting alpha-amino-gamma-methylmercaptobutyronitrile (hereinafter called methionine nitrile) is hydrolyzed with sulfuric acid to give a reaction product which, upon neutralization with aqueous ammonia or other like alkaline agent, gives a solution containing methionine. This solution also contains ammonium sulfate and/or bisulfate (produced by hydrolysis of the nitrile), as well as certain organic by-products which vary in composition from colorless, volatile, odorous, low-molecular weight compounds to high molecular weight tarry bodies. Some of these impurities contain both sulfur and nitrogen, as does methionine. Some of the colorless, low-molecular weight by-products give rise to colored higher molecular weight tars during the product work-up. These by-products increase the solubility of methionine in the mixture. Their presence renders the separation of pure methionine in high yield extremely difficult and troublesome. These difficulties are aggravated by the fact that the tarry bodies interfere with filtrations, crystallizations, and other similar essential operations in the purification process.

Heretofore, various methods have been employed for separating amino acids from aqueous solutions containing ammonium sulfate or ammonium bisulfate and an amino acid. One such method, disclosed in U. S. Patent 2,071,282, is to add ammonia (in non-aqueous form or in the form of an aqueous solution), which causes precipitation of the ammonium sulfate, thus producing a solution from which the amino acid can be crystallized by vaporizing the solvent. Attempts have also been made to salt out amino acids by the use of certain soluble inorganic salts, but, in general, these methods have not been successful because soluble inorganic salts, almost without exception, have been found to increase rather than decrease solubility of amino acids in water.

In the copending application of E. C. Kirkpatrick, S. N. 618,781, filed September 26, 1945, now U. S. Patent 2,443,391, it is disclosed that pure methoinine can be obtained by heating methionine nitrile with dilute aqueous sulfuric acid, neutralizing the reaction product to a pH of 5 to 6 by addition of ammonia, and adding ammonium sulfate (e. g. in the form of recycled mixture containing neutralizing ammonia and ammonium sulfate) directly to the neutralization mixture whereby a precipitate containing methionine and coagulated tarry material is formed. The tarry by-products in process of application S. N. 618,781, are formed from substances which, unless removed, interfere with the isolation of pure methionine, and moreover, have the effect to increasing the solubility of methionine in water. The present invention is concerned with an improved method for removing such impurities from methionine nitrile hydrolysis crudes.

These interfering substances cannot be removed from methionine nitrile hydrolysis products by extraction with common solvents (petroleum ether, cyclohexane, esters, ketones, chloroform, etc.), because such extracting media do not possess high solvency for the said substances.

An object of this invention is to provide an improved method for separating pure methionine from the products of methionine nitrile hydrolysis. Another object is to provide a solvent extraction process whereby the separation of substances which interfere with the separation of pure methionine from methionine nitrile hydrolysis products can be effected. A further object is to recover the by-products of methionine nitrile hydrolysis, namely ammonium sulfate, ammonia and organic by-products, in a form in which they are economically handled and disposed of. Other objects of the invention appear hereinafter.

These and other objects are accomplished in accordance with the invention by extracting an aqueous solution of methionine nitrile hydrolysis products preferably with an alcohol solvent of the class consisting of benzyl alcohol, cyclopentanol, cyclohexanol, methyl cyclohexanol, phenyl ethyl alcohol, and n-butanol, and recovering methionine from the resultant aqueous residue. It has been discovered in accordance with this invention that these specific alcohols are quite unique in their ability to extract organic by-products from methionine nitrile hydrolysis mixtures.

Closely related straight chain alcohols (n-pentanol, n-hexanol, methoxyethanol, etc.) gave relatively poor results; moreover, cyclohexyl compounds other than cyclohexanol (e. g., cyclohexanone, cyclohexyl esters, etc.) are likewise ineffective. The branched chain higher alcohols, e. g. 2-ethyl hexanol and 3,5,5-trimethyl hexanol, are ineffective, evidently because they do not dissolve the interfering substances. The herein disclosed preferred solvents combine low solvency for methionine with high solvency for the organic impurities, and low solvency with water; these are the characteristics which an extracting solvent must have in the practice of the present invention. In a specific embodiment, the invention is based upon the discovery that variations in pH affect the extractability of these impurities, best results being obtained at a pH of 4 to 7.5.

The invention contemplates the separation of pure methionine from methionine nitrile hydrolysis products by extracting organic substances (other than methionine) from an aqueous solution of methionine nitrile hydrolysis products with the aforesaid preferred alcohols, and thereafter separating methionine from the resultant aqueous residue. This final separation of methionine from the residue may be accomplished by any suitable method such as by chilling the aqueous mixture or by concentrating and cooling the same whereby crystallization of methionine takes place. The optimum temperature for extraction of the impurities from the methionine nitrile hydrolysis products is about 90° to 100° C., although higher or lower temperatures may be employed if desired.

For best results it is generally preferred to control the pH at about 4 to 7.5 during the extraction, as stated above. However, the invention may be practiced by extracting the impurities from the acidic hydrolysis mixture without controlling the pH or without neutralizing any of the acidic catalyst which is present in the mixture. The extraction can be carried out without pH control, with good results, especially if the extracting medium is a sufficiently good solvent for the impurities, and a non-solvent for methionine and water; an outstanding example of such an extracting medium is benzyl alcohol. Cyclohexanol may also be used in this manner quite satisfactorily, but it is preferable to control the pH at 6 to 7.5 when the extracting medium is cyclohexanol, to assist in removal of the by-products.

Among the very best solvents for use in practicing the invention are benzyl alcohol, cyclopentanol and cyclohexanol.

The invention utilizes the discovery that by extraction of an acidic or neutralized aqueous solution of methionine nitrile hydrolysis products with the herein disclosed solvents, an aqueous residue is obtained from which methionine, which has relatively little undesirable color or odor, can easily be obtained. For the preparation of highly purified methionine it is desirable to heat the aqueous residue, after extraction with the solvent, with decolorizing charcoal, whereby a pure, colorless product is obtained.

When the neutralization step is included in the practice of the invention it is not necessary that the methionine nitrile hydrolysis mixture be neutralized with ammonia, i. e., in particular embodiments other neutralizing agents such as calcium oxide or calcium hydroxide may be employed. When these latter neutralizing agents are used, it is generally desirable to separate calcium sulfate from the resultant mixture by filtration prior to the extraction.

The invention is illustrated further by means of the following examples.

*Example 1.*—A hydrolysis mixture (17% methionine), obtained by heating crude methionine nitrile with 45% aqueous sulfuric acid at boiling temperature for 90 minutes, was neutralized with concentrated aqueous ammonia to a pH of 6 and the resulting mixture was diluted with water until the concentration of methionine was 6.7%. The solution thus obtained was heated at a temperature of 90° to 100° C., and was stirred for about 30 minutes with approximately 2 parts by weight of cyclohexanol per part of methionine present. The cyclohexanol layer was then drawn off and the resulting aqueous residue was extracted a second time by the same procedure, using a similar quantity of cyclohexanol. The extracted aqueous solution was concentrated by evaporation until it contained about 10% methionine and 27% $(NH_4)_2SO_4$, and the resulting concentrated mixture was cooled to 10° C. whereby a thick slurry of methionine in ammonium sulfate solution was obtained. This was filtered and the filter cake thus obtained was washed with a quantity of cold water about equal to the weight of methionine present. The resulting moist solid, which contained methionine contaminated with ammonium sulfate, was dissolved in a sufficient quantity of water to form a 12% solution of methionine. This solution was heated at a temperature of 95° to 100° C. with a small quantity of decolorizing charcoal. The resulting mixture was filtered, concentrated to about 20% methionine, cooled to a temperature of about 5° to 10° C. whereby crystallization of the methionine took place. This methionine was removed by filtration in the form of substantially pure white crystalline flakes. The ammonium sulfate liquors (first filtrate and wash) were combined and evaporated to dryness, yielding a brownish white solid which analyzed 92% $(NH_4)_2SO_4$. The cyclohexanol in the extract was recovered by distillation in a form suitable for reuse in the purification of an additional quantity of crude methionine.

*Example 2.*—The hydrolysis product (21% methionine) obtained by heating methionine nitrile with 45% aqueous sulfuric acid at about boiling temperature for 90 minutes, was neutralized to a pH of about 6 with an ammoniacal recycle liquor which was produced as described below. The resulting mixture was diluted with the mother liquor obtained in a previous recrystallization of methionine from water, yielding a solution containing about 7.5% methionine, 13% $(NH_4)_2SO_4$ and 1% by-products. This solution was extracted twice with cyclohexanol at 95° C., the quantity of cyclohexanol employed in each extraction being about 1.5 parts by weight per part of methionine present. The aqueous layer was withdrawn and concentrated to a methionine content of about 14%. The concentrated solution of methionine was cooled to 0° C. and centrifuged, whereby a moist methionine cake was obtained. This moist cake was pressed to remove most of the ammonium sulfate liquor, and was then redissolved in sufficient hot water to make a 10% solution of methionine. After decolorization with charcoal, this solution was cooled to 0° C. and the resultant precipitate of crystalline methionine was separated from mother liquor by centrifuging. The mother liquor was recycled and used again as a diluent, as above described. About one-third of the combined ammonium sulfate liquors was purged; the remainder was cooled to 0° C. and treated with anhydrous ammonia to precipitate most of the ammonium sulfate present. The supernatant liquor containing free ammonia was recycled to the reaction vessel in which a fresh batch of crude hydrolysis product was neutralized as described above. Cyclohexanol was recovered from the cyclohexanol extract by distillation.

Example 3.—A 292.4 gram sample of methionine-containing hydrolyzate, obtained by heating methionine nitrile for about 90 minutes with 45% aqueous sulfuric acid at boiling temperature, was neutralized to a pH of 6 with 120 grams of concentrated aqueous ammonia. The resulting neutralized hydrolyzate contained 49.8 grams of methionine, 130 grams $(NH_4)_2SO_4$ and about 10 grams of organic by-products. This mixture was diluted with water to a total weight of 750 grams and was extracted twice with 90 grams of cyclohexanol at a temperature of about 90° to 100° C. A portion of the aqueous layer (48.5% of the total) was withdrawn and concentrated until the methionine content was 14%. The concentrated mixture was cooled to 10° C. for three hours and the resultant precipitate of methionine was removed by filtration. This methionine was reslurried with 30 grams of cold water and the mixture was again filtered, yielding a filter cake which had a dry weight of 29.6 grams. This filter cake analyzed 21% $(NH_4)_2SO_4$ and about 74% methionine. This cake was redissolved in hot water, decolorized with charcoal and the methionine therein was recovered in substantially pure form by crystallization from the resulting solution.

Example 4.—Methionine nitrile hydrolysis crude, obtained by hydrolyzing methionine nitrile with aqueous sulfuric acid was extracted with the solvents listed in the following table, under comparative conditions similar to those used in Example 3, except that the neutralization was carried to a pH of 7.0 to 7.5, comparative runs being made also at a pH of 2, without neutralization. The table shows the effect of pH on tar removal, with specific solvents. The colors referred to in the table were measured by comparison with Ridgway's color chart (Ridgway, Color Standards and Nomenclature, Washington, D. C., 1912). In each of the experiments reported in the table the impurities were extracted selectively, the extraction being more efficient at a pH of 7 to 7.5 than at a pH of 2.

separation of organic impurities from methionine obtained by hydrolysis of methionine nitrile through the use of an alcohol of the aforementioned class as a solvent for the said impurities. This method, in its broad aspects, is applicable not only to solutions of methionine nitrile hydrolysis products but also to solid methionine crudes containing the impurities resulting from the methionine nitrile hydrolysis; such solid crudes (with or without redissolving the methionine in water) can be extracted with the solvents disclosed herein. The methionine thus obtained can be further purified by treatment with decolorizing charcoal, and/or by recrystallization from water.

Extraction of the impurities with cyclohexanol or other preferred solvent as herein disclosed results in improved yields of purified methionine, improved appearance and quality of the purified methionine, more economical plant operation (due in part to the ease of handling extract rather than tar in commercial operation, and to decreased consumption of decolorizing charcoal), facilitated removal of certain impurities which are not removed by decanting the tar and treating the residue with decolorizing charcoal, and decreased losses in the crystallization of methionine (due not only to the fact that a smaller quantity of impurity remains to be removed by recrystallization, but more significantly, to the fact that a 25 to 30% decrease in solubility of methionine in the aqueous layer at room temperature results from the extraction treatment).

When "methionine nitrile hydrolysis products" are referred to herein, it is to be understood that the expression is intended to include the products of the hydrolysis regardless of whether or not the hydrolyzing acid forms a salt with the amino group of the methionine nitrile. Such a salt may, at least theoretically, be produced when the acid acts upon the amino group, after which hydrolysis of the nitrile group and formation of free methionine occurs.

Since many embodiments of the invention may be made without departing from the spirit and scope thereof, I do not limit myself except as set forth in the following claims.

I claim:

1. In a process for separating pure methionine from methionine nitrile hydrolysis products, the steps which comprise extracting an aqueous solution of methionine nitrile hydrolysis products at a pH of 2 to 7.5 with an alcohol of the class con-

*Extraction of impurities from methionine nitrile hydrolysis liquors*

| Solvent | pH | Color of Crude Hydrolysates before Extraction | Color of Hydrolysates After Extraction | Color of Extract |
|---|---|---|---|---|
| cyclohexanol | 2 | yellow ochre | deep colonial buff | xanthene orange. |
| Do | 7 to 7.5 | buckthorn brown | amber yellow | mahogany red. |
| benzyl alcohol | 2 | yellow ochre | citron yellow | xanthene orange. |
| Do | 7 to 7.5 | wax yellow | pale glass green | do. |
| cyclopentanol | 2 | yellow ochre | citron yellow | do. |
| Do | 7 to 7.5 | buckthorn brown | do | burnt sienna. |
| methyl cyclohexanol | 2 | primuline yellow | strontian yellow | primuline yellow. |
| Do | 7 to 7.5 | strontian yellow | citron yellow | wax yellow. |
| phenyl ethyl alcohol | 2 | xanthene orange | straw yellow | ocraceous yellow. |
| Do | 7 to 7.5 | mars yellow | naphthalene yellow | wax yellow. |
| n-butanol | 2 | yellow ochre | strontian yellow | tawny. |
| Do | 7 to 7.5 | wax yellow | clear dull green | buckthorn brown. |

It is to be understood that the above examples are illustrative only and that they are not intended to limit the invention in any way. In its broadest aspects the invention contemplates the sisting of benzyl alcohol, cyclopentanol, cyclohexanol, methyl cyclohexanol, phenyl ethyl alcohol, and n-butanol, and thereafter separating methionine from the resultant aqueous residue.

2. In a process for separating pure methionine from methionine nitrile hydrolysis products, the steps which comprise extracting from an aqueous solution of methionine nitrile hydrolysis products at a pH of about 4 to 7.5 with cyclohexanol the organic substances other than methionine formed by the said hydrolysis and thereafter separating methionine from the resultant aqueous residue.

3. In a process for separating substantially pure methionine from methionine nitrile hydrolysis products, the steps which comprise extracting organic by-products of the said hydrolysis from an aqueous solution of the said hydrolysis products with an alcohol of the class consisting of benzyl alcohol, cyclopentanol, cyclohexanol, methyl cyclohexanol, phenyl ethyl alcohol, and n-butanol at a pH of 6 to 7.5 and a temperature of about 90° to 100° C., and thereafter separating methionine from the resultant aqueous residue.

4. A process for separating substantially pure methionine from methionine nitrile hydrolysis products, which comprises adding ammonia to the said hydrolysis products obtained by heating methionine nitrile with hot dilute aqueous sulfuric acid, the quantity of the said ammonia being sufficient to raise the pH of the said hydrolysis products to from 4 to 7.5, extracting the resulting mixture with cyclohexanol and thereafter separating methionine from the resultant aqueous residue.

5. A process for separating substantially pure methionine from methionine nitrile hydrolysis products, which comprises adding ammonia to the said hydrolysis products obtained by heating methionine nitrile with hot dilute aqueous sulfuric acid, the quantity of the said ammonia being sufficient to raise the pH of the said hydrolysis products to from 4 to 7.5, extracting the resulting mixture with benzyl alcohol and thereafter separating methionine from the resultant aqueous residue.

6. A process for separating substantially pure methionine from methionine nitrile hydrolysis products, which comprises adding ammonia to the said hydrolysis products obtained by heating methionine nitrile with hot dilute aqueous sulfuric acid, the quantity of the said ammonia being sufficient to raise the pH of the said hydrolysis products to from 4 to 7.5, extracting the resulting mixture with cyclopentanol and thereafter separating methionine from the resultant aqueous residue.

7. A process for separating substantially pure methionine from methionine nitrile hydrolysis products which comprises neutralizing, with an aqueous solution containing ammonia and ammonium sulfate, the said hydrolysis mixture obtained by hydrolysis of methionine nitrile with hot aqueous dilute sulfuric acid, the quantity of the ammonia in the said solution of ammonia and ammonium sulfate being sufficient to raise the pH of the hydrolysis mixture to from 6 to 7.5, extracting the resulting mixture with cyclohexanol at a temperature of about 90° to 100° C., recovering methionine from the aqueous layer resulting from the said extraction, precipitating ammonium sulfate from the mother liquor obtained in the said crystallization of methionine by addition of ammonia, separating the supernatant aqueous solution of ammonia and ammonium sulfate from the said precipitated ammonium sulfate, and using the said solution of ammonia and ammonium sulfate for the neutralization of an additional quantity of the said methionine nitrile hydrolysis mixture.

8. A process for separating from methionine impurities obtained by acid hydrolysis of methionine nitrile which comprises extracting the said impurities from the hydrolysis product with an alcohol of the class consisting of benzyl alcohol, cyclopentanol, cyclohexanol, methyl cyclohexanol, phenyl ethyl alcohol, and n-butanol at a pH of 2 to 7.5.

9. In a process for preparing pure methionine, free of the impurities obtained by acid hydrolysis of methionine nitrile, the step which comprises extracting such impurities from the said hydrolysis product with cyclohexanol at a pH of 2 to 7.5.

10. In a process for preparing pure methionine, free of the impurities obtained by acid hydrolysis of methionine nitrile, the step which comprises extracting such impurities from the said hydrolysis product with cyclopentanol at a pH of 2 to 7.5.

11. In a process for preparing pure methionine, free of the impurities obtained by acid hydrolysis of methionine nitrile, the step which comprises extracting such impurities from the said hydrolysis product with benzyl alcohol at a pH of 2 to 7.5.

ROBERT D. KRALOVEC.

REFERENCES CITED

The following references are of record in the file of this patent:

UNITED STATES PATENTS

| Number | Name | Date |
|---|---|---|
| 2,071,282 | Gluud et al. | Feb. 16, 1937 |
| 2,443,391 | Kirkpatrick | June 15, 1948 |